Aug. 27, 1968     I. O. SALYER ET AL     3,399,103
VIBRATION DAMPING COMPOSITION AND LAMINATED CONSTRUCTION
Filed May 8, 1964

INVENTORS.
IVAL O. SALYER
GEORGE L. BALL III
BY Mary B. Moskier
ATTORNEY

United States Patent Office 3,399,103
Patented Aug. 27, 1968

3,399,103
VIBRATION DAMPING COMPOSITION AND
LAMINATED CONSTRUCTION
Ival O. Salyer, Dayton, Ohio, and George L. Ball III, Medford, Mass., assignors to Monsanto Research Corporation, St. Louis, Mo., a corporation of Delaware
Filed May 8, 1964, Ser. No. 365,877
19 Claims. (Cl. 161—68)

ABSTRACT OF THE DISCLOSURE

A material for damping or mitigating vibration, e.g. of ship hulls, which comprises a polymer composition consisting essentially of a vinyl halide/olefin copolymer and a plasticizer therefor and, as a filler, an inorganic solid in platelet form having a diameter of from 44 to 250 microns, the filler being present to the extent of 20% to 80% by weight of the composition.

---

Figure 1:
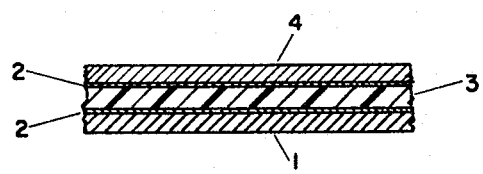

The present invention relates to damping materials, and more particularly provides new and valuable vibration damping material, structural bodies of decreased resonance, metal sheeting having the damping material firmly adhered thereto and especially the method of constructing the hulls of submarine and other craft to render them of substantially non-resonant character.

Rubber and other elastomers have been used as vibration-deadening compositions in the manufacture of such structures as automobile doors, underbodies and shock-absorbers, electric typewriter housings, aircraft, marine craft, air-conditioning ducts, motor housings and mountings, etc. Such materials, however, have not been generally satisfactory because while they served in some cases to deaden sound, high damping over a broad range of frequency and temperature ranges was generally not attained; moreover, in many instances the damping composition did not possess the necessary stability to air, water, light, fuels, lubricants, hydraulic fluids, etc. Also, for many applications, particularly in the fabrication of marine and aircraft, effective damping of sound could be obtained only at the expense of unduly weighting the craft. A further undesirable property of some of the prior damping compositions was their inability to dissipate heat: although they served to deaden sound, they also served to store up heat. Thereby the damping composition, e.g., sponge rubber, would deteriorate rapidly, decomposing and shrinking to a product of no damping value.

According to the invention, there are provided damping compositions which are free of many of such objectionable characteristics and in which damping efficacy is improved to a substantial degree, particularly within the ordinarily encountered temperature range of, say, from 0° C. to 30° C. The present compositions are thus efficient damping agents for wall panels, hulls of marine-craft and aircraft, supports and housings for machinery, etc.

The presently provided vibration-damping composition comprises a normally solid copolymer of a vinyl halide and an olefin of from 2 to 4 carbon atoms and, in intimate contact with the copolymer, an inorganic comminuted solid in platelet form and having a diameter of from 44 to 250 microns, the proportion of the comminuted solid being, say, from 20% to 60% by weight of the polymer composition. The polymer composition may or may not also contain plasticizers, stabilizers, dyes, pigments, other fillers, etc.

Suitable polymers include the copolymers of a vinyl halide, e.g., vinyl chloride, vinyl fluoride, vinylidene chloride, 1,1-dichloro-2-fluoroethylene or vinylidene chlorofluoride and such olefins as ethylene, propylene, or 2-butene. The presently useful copolymers will be normally solid materials having an average molecular weight of, say, at least 5,000 and preferably of from about 20,000 to about 100,000. The presently useful copolymers may or may not be vulcanized, e.g. by treatment with a peroxide or a dienic cross-linking agent.

The ratio of vinyl halide to olefin which is present in the copolymer may vary widely, e.g., there may be present from say, 90 to 40 parts by weight of vinyl halide with the balance being the olefin. For obtaining maximum efficacy at customarily encountered temperatures and frequencies, copolymers containing say, from 65 to 85% by weight of copolymerized vinyl chloride and from 35% to 15% by weight of copolymerized olefin are preferred. Particularly when the damping composition is designed for use in applications involving hazards of fire, it is desirable to employ in the copolymer component a vinyl halide olefin ratio of say 69:32 to 78:22.

Depending upon the copolymer and the manner in which it is to be applied for damping purposes, the damping composition may or may not contain a plasticizer. The plasticizer, when used, may be any material which plasticizes the copolymer and is compatible therewith. When the damping composition is intended for use at generally encountered environmental conditions, the plasticized copolymer advantageously should possess a glass transition temperature of from, say, −10° C. to 90° C. and preferably from 10° C. to 50° C. The nature of the plasticizer and the quantity thereof which is employed will vary with the nature and quantity of the olefin. As the carbon chain length of the olefin increases, the copolymer becomes less rigid and is more plastic. Advantageously employed are, say, from 10 to 100 parts by weight of the plasticizer, based on the weight of the copolymer, depending upon the nature of the polymer and plasticizer and the temperature conditions at which it is intended to use the damping compositions.

The plasticizer which is useful with the vinyl halide/olefin copolymers may be any material which the art recognizes to impart plasticizing effect to such polymers. Generally the plasticizers are esters, e.g., phthalates, sebacates, epoxidized oleates, adducts of olefinic compounds and dialkyl fumarates, glycolates, ricinoleates, aliphatic-aromatic sulfonamides, aliphatic-aromatic phosphates, etc. Examples of some specific plasticizers are dibutyl phthalate, butyl benzyl phthalate, butyl decyl phthalate, octyl isodecyl phthalate, dibutyl sebacate, the adduct of dibutyl fumarate and butyl oleate, tricresyl phosphate, acetyl butyl ricinoleate, epoxidized amyl oleate, methyl phthalyl ethyl glycolate, mixture of N-ethyl-o-and p-toluenesulfonamide, N-cyclohexyl-p-toluenesulfonamide, etc.

We have found that when the normally solid vinyl halide-olefin copolymer compositions are combined with the hereinbefore defined chemically inert, inorganic filler in platelet form, e.g., graphite or mica particles in platelet form, there are obtained compositions which possess surprisingly good damping properties for noises encountered in daily living, machine operation, travel in water or air, etc. At temperatures of, say, from 60° F. to 98° F., the present compositions efficiently damp vibrations within the, say, 100 c.p.s. to 6000 c.p.s. or even 10,000 c.p.s. range. Although the unfilled copolymers, plasticized or unplasticized, possess substantially no damping effect under such conditions, and although the use of conventional fillers in powdered or fibrous form does not substantially modify the damping properties of either the unplasticized or plasticized copolymers, use of the platelet type filler with plasticized or unplasticized vinyl halide olefin copolymers converts the hitherto substantially inefficient materials into compositions of high utility in damping applications.

The particle size and structure of the platelet component of the presently employed filler appears to be critical. Although the inorganic, platelet type filler, alone, contributes to damping efficacy, the efficacy is surprisingly increased when powdery, non-graphitic carbon black is added thereto even in quantities which are as low as about one percent by weight of the platelet type filler. The mixture of the platelet type filler and the carbon black thus produces synergistic effect.

Particularly valuable as the platelet type filler for the present purpose is non-amorphous graphite, i.e., graphite having a platelet or flake structure. Such graphite is commercially available in suitable grades, i.e., in a particle size of from 44 to 250 microns. Of the commercial, flaked graphites, the following has been found to be especially useful: 100% through 50 mesh, 30% maximum through 200 mesh, 0% finer than 325 mesh. In order to obtain comparative data, Dixon No. 2(1102) graphite has been used in the examples which follow, unless otherwise indicated. However, platelet graphite having an average diameter of up to 250 microns is generally useful for the present purpose.

Examples of other presently useful platelet fillers include various micas, asbestos, talc, flaked aluminum, flaked lead, molybdenum sulfide, magnesia, magnesium carbonate, etc. These materials are generally commercially available.

The carbon black which may be used with the graphite may be any pulverulent, non-graphitic black. It may be a channel black, a furnace black, or an acetylene or thermal black. Although for use as fillers for rubber or as ink-pigments, the carbon blacks have been variously differentiated by such properties as tinting strength, surface area, oil absorption and electrical resistivity, for the present purposes such characteristics are of little, if any, importance because high physical strength and abrasion resistance as in rubber tires is not a required property of sound absorbents, and neither is electrical resistivity as in rubber insulators nor color intensity and tone as in printing inks. Although I do not know the mechanism which is responsible for the increase in damping effect caused by employing the pulverulent carbon black with the platelet filler, from the fact that only very small amounts of the non-graphitic black are effective, it may be assumed that introduction of the powdery black increases the stiffness modulus of the composition and thereby renders the graphite more effective acoustically. Whether that be true or not, the particle size and hence the surface area of the non-graphitic carbon is of so little consequence for the present purpose that there may be used in formulation of the present damping compositions any of the commercially available furnace process blacks, channel process blacks, thermal process blacks or lampblack process blacks which may range from very fine blacks having a mean particle size of, say, 13–15 millimicrons to coarse grades having a mean particle size of up to, say, 500 millimicrons and even up to the particle size of the graphite. The rubber-grade carbon blacks which have a mean particle size of from about 20 to 85 millimicrons are conveniently used owing to ease in availability. Of these, may be mentioned such tradenamed carbon blacks as Kosmos, Sterling, Dixie, Witco, etc. In the working examples which follow, there has been used the same carbon black in order to show meaningful comparative data insofar as effect on other constituents of the damping composition is concerned. This black, supplied to the trade as Sterling S, is a semi-reinforcing furnace (SRF) black. Such blacks generally have a mean particle size of from about 80 to 260 millimicrons.

The useful proportion of the non-graphitic carbon to graphite is from 1 to 60 parts of the carbon black per 99 to 40 parts of the graphite, depending upon the extent of damping property desired, and the nature of the polymeric composition with which the filler is used, cost factors to be considered, etc. Generally the adjuvant effect of the non-graphitic carbon on the platelet filler begins to decrease after substantially more than an equal weight of the carbon black has been used per weight of the platelet filler; hence for most purposes a quantity of, say, 1 to 50 parts by weight of carbon black per 99 to 50 parts of the platelet filler, e.g., graphite, is useful. However, optimum results are obtained within the lower range of carbon black; therefore from 1 to 5 parts of the carbon black per 99 to 95 parts of graphite is preferred.

The quantity of filler to be employed will vary with the nature of the viscoelastic polymer, but will be between 20% to 80% by weight of said polymer, and preferably from, say, 35% to 55%. In the examples which follow, the filler to polymer weight ratio has been generally maintained at ca. 40:60; however, as will be appreciated by those skilled in the art, the limiting ratios will depend upon the physical and mechanical properties desired, e.g., cohesion, moldability, etc.

The damping composition may or may not contain the usual additive constituents of polymeric compositions, e.g., heat- and light-stabilizers such as the metal salts of higher fatty acids, e.g., cadmium barium laurate, tin oleate, or epoxidized fatty acid esters. or flame-proofing materials such as tris(bromopropyl) phosphite, phosphoramide, antimony trioxide, etc. Such additives will be present in a quantity of, say, from 0.1% to 10% by weight of the damping composition.

The invention is further illustrated by, but not limited to, the following examples:

Example 1

A 28:72 weight ratio ethylene/vinyl chloride copolymer was mixed on the rolling mill with flake graphite (Dixon No. 2, (1102)) in a quantity calculated to give a composition containing about 40% by weight of said graphite. It was then molded, at say, 235° F. for about 5 minues in a 1/8" x 1/2" x 7.5" mold, using enough pressure to obtain coherence. The molded piece was then bonded to a 1/8" x 1/2" x 8" steel bar in such a manner that it covered the 1/2" face of the steel, while leaving an exposed terminal portion at one end to provide for clamping in a vise. The bonding was accomplished by means of a rigid adhesive, say, a solvent-less epoxy adhesive. The commercially obtained epoxy adhesive A–12, provided by Armstrong Products Company, Warsaw, Ind., was used in this instance. It consisted essentially of an epoxy resin containing an inert alumina as filler and a polyamide curing agent. The steel bar was cleaned with, e.g., acetone, the bar was coated with said adhesive, and said molded test bar of the ethylene/vinyl chloride copolymer plus graphite filler was placed on the adhesive with any excess of adhesive being pressed out while under weight during a 24-hour cure at room temperature.

Evaluation of damping efficacy was then conducted by the vibrating beam method as follows: That end of the steel bar which was not covered with the molded composition was clamped into a rigid steel vise and to the other end of the bar there was mounted the core of a linear variable differential transformer, said core extending into the transformer. The transformer primary was excited by a 10 kc. current. The output signal of the transformer was proportional to the core displacement, and was fed into a demodulating circuit. The demodulated signal was displayed on an oscilloscope and photographed by an oscilloscope camera. The beam was set into free vibration by an initial manual displacement, and the beam motion versus time was then recorded on film. The ratios of the amplitudes of successive oscillations were measured on the photographed trace, and were then converted to percent critical damping, (percent $c/c_o$), as determined from the relationship:

$$\text{Percent } c/c_o = \frac{\Delta}{2\pi} = 36.64 \log_{10} \frac{\alpha_1}{\alpha_2}$$

where $$\Delta = \log_{10} \frac{\alpha_1}{\alpha_2}$$

and $\alpha_1$ and $\alpha_2$ are the amplitudes of two successive vibrations. The higher the percent $c/c_o$ value, the better the damping, A $c/c_o$ value of 1.0% or more indicates acceptable damping and the greater the temperature range over which a value of 1.0% or more is obtained the more practical utility does the composition possess. The temperature range within which efficiency is demonstrated should be, of course, that at which the damping composition is to be used. For general application, including utility in marine craft, the temperature range at which the percent $c/c_o$ is greater than one should be from, say 0° C. to 60° C.

The following circuitry is involved in the above-described vibrating beam method.

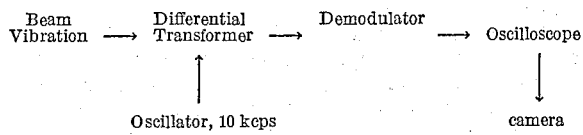

In order to permit testing at various temperatures, the device was mounted in a controlled-temperature cabinet.

Testing was conducted at a frequency of 60 c.p.s. and at the temperatures shown below. The following results were obtained:

| Temperature, °F.: | Percent $c/c_o$ |
|---|---|
| 52 | 1.0 |
| 60 | 2.0 |
| 66 | 3.0 |
| 75 | 6.7 |
| 80 | 7.3 |
| 87 | 6.0 |
| 94 | 3.0 |
| 104 | 2.0 |
| 115 | 1.3 |

The very good damping property of the graphite-filled ethylene/vinyl chloride copolymer is evident from the fact that the range at which the percent $c/c_o$ value is greater than 1.0 is about 63° F. and that the greatest efficiency is demonstrated at the most commonly encountered temperatures, i.e., at 66° F. to 94° F.

Example 2

A 64.2:35.8 weight ratio ethylene/vinyl chloride copolymer was milled with the flake graphite described in Example 1 in a quantity calculated to give a composition containing about 40% by weight of the graphite. It was then molded under heat and pressure to a $\frac{1}{16}''$ x $\frac{1}{2}''$ x 7.5'' bar. The molded bar was then bonded to a $\frac{1}{8}''$ x $\frac{1}{2}''$ x 8'' steel bar, in such a manner that it covered the $\frac{1}{2}''$ face of the steel, with a terminal portion of the steel being left exposed to serve as the clamping end. Testing as in Example 1 showed damping efficacy at substantially low temperatures, with the percent $c/c_o$ value increasing from 1 to 3 as the temperature was decreased from 55° F. to 35° F.

Example 3

The following formulation was mixed and molded using the copolymer of Example 2.

| Component: | Weight percent |
|---|---|
| Ethylene-vinyl chloride copolymer | 34.5 |
| Flake graphite, Dixon 1102 | 40.5 |
| Butyl benzyl phthalate | 20.5 |
| Antimony oxide | 1.7 |
| Epoxidized soya bean oil stabilizer | 0.64 |
| Mark LL stabilizer | 0.64 |
| Carbon black | 1.5 |
| Stearic acid | 0.15 |

Mark LL is a stabilizer consisting of a combination of a barium alkyl phenate, cadmium 2-ethylhexanoate and a tertiary phosphite ester, supplied by Argus Chemical Company and prepared as described in U.S. Patent No. 2,716,092. The carbon black is a semi-reinforcing furnace black supplied as "Sterling S" by the Cabot Corporation and having a mean particle size of from about 80 to 160 millimicrons. All liquid components were mixed together by hand. The stabilizers and the carbon black were added to the liquid and stirred in. Graphite was added into the wet mix and mixed by hand. The whole was then mixed on the Banbury for 5 minutes, with cooling water running continuously. The resulting composition was milled on rolls to give an 0.092'' thick sheet, and the latter was cemented, by means of the rigid epoxy resin described in Example 1, to a 0.063'' thick steel sheet. Test bars for the vibrating beam test of Example 1 were cut from the sheet. The following results were obtained at 60 cycles and at the temperatures shown below.

| Temperature, °F.: | Percent $c/c_o$ |
|---|---|
| 6.8 | 0.60 |
| 13.2 | 1.29 |
| 20.0 | 5.22 |
| 23.0 | 7.60 |
| 27.8 | 7.53 |
| 34.5 | 3.47 |
| 39.2 | 2.04 |

Example 4

A formulation comprising a 28:72 weight ratio ethylene/vinyl chloride copolymer was prepared by mixing together the following:

| Component: | Weight percent |
|---|---|
| Above copolymer | 47.6 |
| Graphite, Dixon No. 2 | 50.0 |
| Epoxidized soya bean oil stabilizer | 1.2 |
| Mark M stabilizer | 1.2 |

Mark M is a commercially available mixture of a barium hydrocarbon-substituted phenolate and a cadmium salt of a higher fat acid prepared as described in U.S. Patent No. 2,716,092.

The above mix was molded into a sheet and a test specimen 2'' x 0.375'' x 0.02'' was cut therefrom and evaluated for damping efficiency by the forced torsion pendulum method. In this procedure, the supporting wire of a standard torsion pendulum is replaced by an 11.5'' length of a fixed rigid steel rod, having a diameter of 0.050 inch. When in shear, this rod constitutes the elastic element to be damped. No bonding of damping material to the material which is to be damped is required, the steel rod being firmly clamped to an inertial member which supports the damping material. There is thus attained a system which is much like that of a homogeneous layer of damping material applied to a steel bar. Deformation of the steel rod was measured with a non-contacting spark recorder near the end of the inertial member and measurements were made at about 3 c.p.s. at the temperatures shown below. The following results were obtained:

| Temperature, °C.: | Percent $c/c_o$ |
|---|---|
| −92 | 5.83 |
| −63.5 | 6.03 |
| −28 | 6.40 |
| +5 | 6.68 |
| +8 | 7.78 |
| +20.5 | 15.23 |
| +20.4 | 9.0 |

Although the above examples show application of the damping composition only by first molding or sheeting it and then bonding it to the structure which is to be rendered less susceptible to vibration, the composition may readily be applied by other methods. For example, the mixture of polymer, platelet filler and, if desired, plasticizer, stabilizer, fire-retardant, pigment, etc.; may contain enough plasticizer to permit troweling it upon the surface of the structure which is to be treated; if it is not sufficiently cohesive, a small amount of solvent may be admixed to render it mastic. A thick viscous coating may be prepared by using an inert, volatile diluent or solvent, e.g., benzene, acetone or isopropanol and the coating of damping composition may be brushed or rolled onto the surface which is to be treated. The present damping composition may be compression molded together with the sheet of structural material which is to be treated and panels of sound-proof materials thus fabricated; or laminates of alternate layers of structural component and damping composition may be manufactured by compression molding, calendering, or extrusion.

The damping efficacy of the composition may be significantly enhanced by constraint, e.g., by constraining the external surface of the damping layer with a layer of stiff, rigid material which may be a film or sheet having a thickness that can approach that of the material to be damped. Shear motion in the damping composition is thereby induced without distortion of the constraining layer, which may be, e.g., aluminum or other metal foil, a rigid molded film or sheet of a thermosetting polymer such as phenolic, melamine or urea resin, sheeted aluminum or other metal, wood laminate, etc.

FIGURE 1 of the drawings illustrates an assembled laminate. The compression molded bar 3 of the damping composition is affixed to the steel substrata 1 by adhesive 2 and the aluminum constraining plate 4 is superimposed upon and fixed to said bar 3 by means of the same adhesive.

Still another method of employing the present damping composition is to use it in conjunction with a rigid porous or honeycombed material that serves as a space layer between the damping composition and the structural component which is to be damped. For this purpose there may be employed stiff honeycombed materials, e.g., of paper, aluminum or steel. For example, a 3" thick aluminum honeycomb spacer can be bonded to, say, a 2" thick structural steel plate, and a 0.5" damping layer may be bonded to the spacer to give a damped panel.

Figure 2:
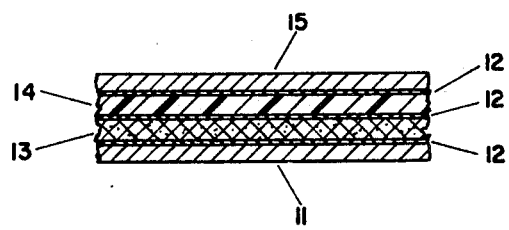

FIGURE 2 of the drawing depicts the substrate 11 to which there is bonded a layer of honeycombed material 13 by means of adhesive 12. Damping layer 14 is superimposed upon and fixed to the honeycomb layer by means of the same adhesive. Constraining layer 15, a stiff, rigid, sheeted body is fixed to the damping layer 14 by means of adhesive 12.

In using molded sheets of the damping composition any means of bonding the molded sheets to other components, i.e., the material to be damped, constraining layer or spacer, may be used. The structural components may be simply clamped or riveted together; however, advantageously, both for the purpose of ease in manipulation and optimum damping efficacy, the damping composition is fixed to the other components by means of cements or adhesives. For this purpose there may be employed any of the numerous, commercially available materials, e.g., cements such as the thermoplastic or thermosetting synthetic resin adhesives. The solventless resins are preferred for ease of application and in order to avoid any possible deteriorating effect of solvent on the molded damping composition. In practice, it has been found that the hardness of the set adhesive is a factor to be considered. When the bonding agent, after set, is softer than the damping composition it contributes somewhat to damping, but it also tends to reduce damping efficacy by reducing the actual straining of the damping material through losses to the less effectual adhesive layer. Generally, no such phenomenon is evidenced when the set hardness of the adhesive is equal to or greater than that of the damping composition. Therefore a rigid, thermosetting adhesive is preferred, e.g., an epoxy, furan, silicone, phenolic, melamine, urea, or polyester adhesives. Inorganic adhesives, such as the litharge or magnesium oxychloride cements are also useful.

The presently provided damping compositions are particularly useful in suppressing vibrations in structural members of marine craft, air-craft and ground vehicles, and for that reason emphasis has been given herein on application of the damping composition to structural members of steel. However, said damping compositions are of general utility. They are likewise useful with other metals and with other materials of construction, and may be employed as impregnants of cellulosic materials for the fabrication of acoustic panels. The damping compositions are useful for controlling vibration of machinery, e.g., printing machines, pumps, motors, or ball mills and are effective thereby not only to reduce noise but also to increase life of service and decrease cost of maintenance. They are generally effective for controlling noise in aid ducts and air-craft septums and for insulating prefabricated panels, curtain walls, doors and other building elements.

Different damping compositions may be used in multiply laminates to give maximum performance over the broadest temperature/frequency range. Optimum ethylene to vinyl chloride ratio and/or plasticizer content for attaining the greatest damping efficacy at the contemplated temperatures and noise levels can be arrived at by routine experimentation; and there may be constructed laminates containing, say, a layer which is most suitable for damping at cold temperatures, another layer which is most suitable at intermediate temperatures, and still another layer which is most suitable at high temperatures. Layers of varied damping compositions for achieving optimum damping over a maximum frequency range can be similarly assembled into highly useful laminates.

The above examples are given by way of illustration only, and the present invention is not to be considered as limited by them. It will be obvious to those skilled in the art that many modifications can be made within the spirit of the invention, which is limited only by the terms of the appended claims.

We claim:

1. A vibration-damping composition comprising a copolymer of a vinyl halide and an olefin of from 2 to 4 carbon atoms and, dispersed in said copolymer, an inorganic comminuted solid in platelet form having a diameter of from 44 to 250 microns, the proportion of the comminuted solid being from 20% to 80% by weight of the composition.

2. The composition defined in claim 1 further limited in that the vinyl halide is vinyl chloride.

3. The composition defined in claim 1 further limited in that the olefin is ethylene.

4. The composition defined in claim 1 further limited in that the inorganic, comminuted solid is graphite.

5. A vibration-damping composition comprising a copolymer of ethylene and vinyl chloride, a plasticizer for said copolymer, and dispersed in said copolymer, graphite particles in platelet form and having a diameter of from 44 to 250 microns, the proportion of the graphite being from 20% to 80% by weight of the composition.

6. A vibration-damping composition comprising a copolymer of ethylene and vinyl chloride, a plasticizer for said copolymer, and, dispersed in said copolymer, a filler consisting essentially of a mixture of pulverulent, substantially non-graphitic carbon black and graphite particles in platelet form having a diameter of 44 to 250 microns, the proportion of the carbon black in said mixture being from 1 to 5 parts by weight of said mixture, and the proportion of filler being from 35% to 50% by weight of the composition.

7. A vibration-damping composition comprising a copolymer of ethylene and vinyl chloride, a plasticizer and, dispersed in said copolymer, a stabilizer for said copolymer, and a filler consisting essentially of a mixture of pulverulent, substantially non-graphitic carbon black and graphite particles in platelet form and having a diameter of from 44 to 250 microns, the proportion of the carbon black in said mixture being from 1 to 5 parts by weight of said mixture, and the proportion of filler being from 35% to 55% by weight of the composition.

8. A vibration-damping composition comprising a copolymer of ethylene and vinyl chloride, a plasticizer and a flame-proofing agent for the copolymer and, dispersed in said copolymer, a filler consisting essentially of a mixture of pulverulent, substantially non-graphitic carbon black and graphite particles in platelet form and having a diameter of from 44 to 250 microns, the proportion of the carbon black in said mixture being from 1 to 5 parts by weight of said mixture, and the proportion of filler being from 35% to 55% by weight of the composition.

9. A vibration-damping composition comprising a copolymer of ethylene and vinyl chloride, a plasticizer, a stabilizer and a flame-proofing agent for the copolymer, and, dispersed in said copolymer, a filler consisting essentially of a mixture fo pulverulent substantially non-graphitic carbon black and graphite particles in platelet form and having a diameter of from 44 to 250 microns, the proportion of the carbon black in said mixture being from 1 to 60 parts by weight of said mixture, and the proportion of filler from 20% to 80% by weight of the composition.

10. As a new article of manufacture, metal sheeting having a layer of the composition of claim 1 firmly adhered thereto.

11. As a new article of manufacture, metal sheeting having a layer of the damping composition of claim 5 firmly adhered thereto.

12. As a new article of manufacture, metal sheeting having a layer of the damping composition of claim 9 firmly adhered thereto.

13. A laminated panel consisting of three successive layers of (1) sheet metal, (2) a rigid honeycombed body, and (3) the damping composition of claim 1.

14. A laminated panel consisting of three successive layers of (1) sheet metal, (2) the damping composition of claim 1, and (3) a stiff, rigid, sheeted body to serve as constraining layer for the damping composition.

15. A laminated panel consisting of three successive layers of (1) sheet metal, (2) the damping composition of claim 5, and (3) a stiff, rigid, sheeted body to serve as constraining layer for the damping material.

16. A laminated panel consisting of four successive layers of (1) sheet metal, (2) a rigid, honeycombed body, (3) the damping composition of claim 1, and (4) a stiff, rigid, sheeted body to serve as constraining layer for the damping material.

17. A marine craft hull of metal sheeting having a layer of the damping composition of claim 1 firmly adhered thereto.

18. A marine craft hull having its walls integrally formed of the laminated panels defined in claim 14.

19. A marine craft hull having its walls integrally formed of the laminated panels defined in claim 13.

References Cited

UNITED STATES PATENTS

| | | | |
|---|---|---|---|
| 2,287,766 | 6/1942 | Davis | 161—95 XR |
| 2,514,185 | 7/1950 | Eberly | 75—171 |
| 2,558,378 | 6/1951 | Petry | 260—17.4 |
| 2,700,630 | 1/1955 | Bukey et al. | 156—231 XR |
| 3,087,573 | 4/1963 | Ross | 161—68 XR |

EARL M. BERGERT, *Primary Examiner.*

H. F. EPSTEIN, *Assistant Examiner.*